(12) United States Patent
Hirata et al.

(10) Patent No.: US 9,021,302 B2
(45) Date of Patent: Apr. 28, 2015

(54) LOAD CONTROL SYSTEM

(75) Inventors: Satoshi Hirata, Mie (JP); Shuji Matsuura, Shiga (JP); Yuji Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 507 days.

(21) Appl. No.: 13/499,791

(22) PCT Filed: Sep. 28, 2010

(86) PCT No.: PCT/IB2010/002424
§ 371 (c)(1),
(2), (4) Date: May 8, 2012

(87) PCT Pub. No.: WO2011/039600
PCT Pub. Date: Apr. 7, 2011

(65) Prior Publication Data
US 2012/0209441 A1    Aug. 16, 2012

(30) Foreign Application Priority Data
Oct. 2, 2009   (JP) .................. 2009-230794

(51) Int. Cl.
*G06F 11/00*   (2006.01)
*G05D 3/12*    (2006.01)
(Continued)

(52) U.S. Cl.
CPC ........... *H02J 13/0003* (2013.01); *H01M 10/44* (2013.01); *H01M 16/006* (2013.01);
(Continued)

(58) Field of Classification Search
CPC .................. H02J 3/12; H02J 3/14; H02J 9/00; H02J 9/02; H02J 9/04; H02J 9/065; H02J 2003/001; H02J 2009/00; H02J 2009/04; Y02B 70/3225; Y02B 70/3291; G06F 1/30; G06F 1/3203; Y04S 20/221; Y04S 20/222; Y04S 20/224; Y04S 20/225; Y04S 20/227; Y04S 20/228; Y04S 20/24; Y04S 20/242; Y04S 20/244; Y04S 20/246; Y04S 20/248; H04Q 1/03; H04Q 1/032
USPC .................. 700/286, 295, 297, 298; 714/1–3, 714/14–16, 22; 307/43, 64, 66, 112, 113, 307/115, 116; 315/160, 161; 340/12.11, 340/12.31, 12.32, 12.37
See application file for complete search history.

(56) References Cited

U.S. PATENT DOCUMENTS 5,260,605 A    11/1993  Barfield
6,445,163 B1 *  9/2002  Chenier et al. ................ 320/133
(Continued)

FOREIGN PATENT DOCUMENTS

JP    H8-37742    2/1996
JP    H9-135541   5/1997
(Continued)

OTHER PUBLICATIONS

Supplementary European Search Report dated Mar. 5, 2014 for corresponding European Application No. EP 10 81 9972.
(Continued)

*Primary Examiner* — Crystal J Barnes-Bullock
(74) *Attorney, Agent, or Firm* — Renner, Otto, Boisselle & Sklar, LLP

(57) ABSTRACT

A load control system includes: a power supply control unit for controlling a power feeding to multiple load devices; and a backup power supply unit for supplying backup power during a power failure. During a power failure, the power supply control unit supplies the power from the backup power supply unit only to a part of load devices selected among the load devices, and the load devices are devoid of communications function for communicating with the power supply control unit.

9 Claims, 4 Drawing Sheets

(51) Int. Cl.
*G05D 5/00* (2006.01)
*G05D 9/00* (2006.01)
*G05D 11/00* (2006.01)
*G05D 17/00* (2006.01)
*H02J 9/00* (2006.01)
*G05B 11/01* (2006.01)
*G08C 19/16* (2006.01)
*H02J 13/00* (2006.01)
*H01M 10/44* (2006.01)
*H01M 16/00* (2006.01)
*H02J 9/06* (2006.01)
*H02J 1/14* (2006.01)
*H02J 1/00* (2006.01)

(52) U.S. Cl.
CPC .......... *H02J 9/061* (2013.01); *H02J 2001/004* (2013.01); *Y02B 90/222* (2013.01); *Y02B 90/228* (2013.01); *Y04S 20/12* (2013.01); *Y04S 20/18* (2013.01); *H02J 1/14* (2013.01); *Y02B 90/14* (2013.01)

(56) References Cited

U.S. PATENT DOCUMENTS

| | | | | |
|---|---|---|---|---|
| 7,340,325 B2 * | 3/2008 | Sousa et al. | ............... | 700/295 |
| 7,472,290 B2 * | 12/2008 | Diab et al. | ............... | 713/300 |
| 7,680,561 B2 * | 3/2010 | Rodgers et al. | ............... | 700/295 |
| 8,049,364 B2 * | 11/2011 | Shakespeare et al. | .......... | 307/64 |
| 8,222,548 B2 * | 7/2012 | Espeut, Jr. | ............... | 200/50.33 |
| 8,461,724 B2 * | 6/2013 | Gonyer et al. | ............... | 307/115 |
| 8,532,265 B2 * | 9/2013 | Wright et al. | ............... | 379/32.04 |
| 8,829,799 B2 * | 9/2014 | Recker et al. | ............... | 315/160 |
| 2005/0044447 A1 | 2/2005 | Dunstan | | |
| 2009/0212632 A1 | 8/2009 | Medugno | | |

FOREIGN PATENT DOCUMENTS

| | | |
|---|---|---|
| JP | 10112943 A * | 4/1998 |
| JP | 2004-328960 | 11/2004 |
| JP | 2008-113500 | 5/2008 |
| JP | 2009-148009 | 7/2009 |
| WO | 99/66703 | 12/1999 |

OTHER PUBLICATIONS

Chinese Office Action dated Dec. 25, 2013 and the English translation thereof for corresponding Chinese Application No. 201080054754.5.
Japanese Office Action dated Feb. 4, 2014 and the English summary thereof for corresponding Japanese Application No. 2009-230794.
Japanese Office Action dated Jul. 22, 2014 for corresponding Japanese Application No. 2009-230794 and English summary thereof.
Chinese Office Action dated Sep. 2, 2014 for corresponding Chinese Application No. 201080054754.5 and English translation thereof.
International Search Report for corresponding International Application No. PCT/IB2010/0024242 mailed Feb. 8, 2011.
Form PCT/ISA/237 for corresponding International Application No. PCT/IB2010/002462 dated Feb. 8, 2011.

* cited by examiner

LOAD CONTROL SYSTEM

FIELD OF THE INVENTION

The present invention relates to a load control system.

BACKGROUND OF THE INVENTION

Conventionally, there has been provided a load control system for operating only a preset load by supplying a power from a backup power supply to the corresponding load during a power failure (see, e.g., Japanese Patent Laid-open Publication No. 2009-148009).

The load control system described in Patent Document 1 supplies a DC power from a main power supply to DC devices connected to DC power supply lines and also supplies a backup power from a backup power supply provided in addition to the main power supply to the DC devices via the DC power supply lines during a power failure in the main power supply. Thus, the DC devices can operate for a predetermined period of time even during the power failure in the main power supply.

In the above-described load control system, when the power is supplied from the backup power supply to all the DC devices connected to the DC power supply lines during the power failure, the backup power supply is used intensively. Therefore, the power is backed up only for a short period of time, which results in requirement of a large capacity backup power supply. Hence, in the load control system described in Patent Document 1, the DC devices are configured to have communications functions, and operation stop is instructed to the DC devices having low priority through communications when a power failure occurs. As a consequence, the power consumption is reduced, and the power backup time is extended.

In such load control system, since the load devices need to have the communications functions for instructing the operation stop during the power failure, the cost of the system increases and specific load devices having the communications functions are required.

SUMMARY OF THE INVENTION

In view of the above, the present invention provides a low-cost load control system which can back up a power to a required load device for a long period of time during a power failure.

In accordance with an embodiment of the present invention, there is provided a load control system, including: a power supply control unit for controlling a power feeding to multiple load devices; and a backup power supply unit for supplying backup power during a power failure, wherein, during a power failure, the power supply control unit supplies the power only to a part of load devices selected among the load devices, and the load devices are devoid of communications function for communicating with the power supply control unit.

Further, the load control system may further include: a power supply unit for supplying an operation power of the whole system; a load operation terminal connected to the power supply control unit via a communications line; a power failure notification unit for outputting, when a the power failure is detected, a power failure notification signal to the power supply control unit; and a number of load circuits, each of which having one or more of the load devices connected to the power supply control unit via power lines, wherein the power supply control unit includes power feeding on/off units, each of which being connected to one of the load circuits, to independently turn on or off the power feeding to corresponding load circuits, thereby operating or stopping the load devices of the load circuits; a first communications unit for receiving a load control signal inputted via the communications line; and a control circuit for switching on or off one or more power feeding on/off units corresponding to the load control signal received by the first communications unit, the load operation terminal includes an operation unit for performing on/off operation of one or more target load circuits; and a second communications unit for receiving an operation input from the operation unit and outputting to the communications line the load control signal for controlling said one or more the power feeding on/off units corresponding to the target load circuits, and the control circuit of the power supply control unit controls, when the power failure notification signal is received from the power failure notification unit, the power feeding on/off units to supply the backup power from the backup power supply unit only to a part of the load circuits.

In accordance with the configuration described above, the backup power is supplied from the backup power supply unit to only the selected load circuits during the power failure without being supplied to other load circuits. Thus, it is possible to achieve the load control system which can back up the power to a required load device for a longer period of time. Further, since the load devices do not require the communications functions, general low-cost devices having no communications function can be used as the load devices. Accordingly, a low-cost load control system can be achieved. Moreover, since a decision on whether or not to supply the backup power during the power failure is set to every load circuit connected to one or more load devices, the setting can be simplified compared to the case of setting whether or not to supply the backup power to every load device during the power failure.

Further, the power supply control unit may further include a setting unit for setting one or more load circuits to which the backup power is supplied during the power failure; and when the power failure notification signal is received, the control circuit may control the power feeding on/off units to supply the backup power from the backup power supply unit only to the load circuits set by the setting unit.

In accordance with the configuration described above, the setting for determining whether or not to supply the backup power during the power failure can be easily changed by using the setting unit.

Further, the backup power supply unit may include a secondary battery, the power supply unit may supply a DC power as the operation power, and the first and the second communications unit may receive and transmit the load control signal by superposing signals on DC voltage.

In accordance with the configuration described above, the entire system is operated by the supplied DC power, and the load devices do not require AC-DC converters for converting an AC power to a DC power. Therefore, conversion loss caused by the AC-DC conversion does not occur, and the power can be saved. When the load devices are operated by the AC power, it is required to convert an output of a secondary battery to an AC power and supply the AC power to the load devices during the power failure. Hence, the conversion loss is caused by the DC-AC conversion, and the power backup time of the secondary battery is reduced. Since, however, the load devices are operated by the DC power in the above configuration, the conversion loss caused by converting the output of the secondary battery to the AC power does not occur, which can extend the power backup time of the secondary battery.

Further, a power level of the backup power supplied by the backup power supply unit may be less than that of the operation power supplied by the power supply unit in a normal state other than the power failure.

In accordance with the configuration described above, a relatively low power is supplied as a backup power by the backup power supply unit during the power failure. Hence, the consumption of the backup power can be reduced compared to the case of supplying a power in a normal state and, also, the load devices can operate for a longer period of time.

Further, the load devices may be lighting devices.

In accordance with the configuration described above, light outputs of the lighting devices relatively decrease during the power failure and, thus, the lighting devices can be turned on for a longer period of time.

Further, the power supply control unit may further include a storage unit for storing a power feeding state of the respective load circuits immediately before the power failure occurs; and when the power failure is recovered, the control circuit may control the power feeding on/off units to return to the power feeding state immediately before the power failure occurs based on the power feeding state stored in the storage unit.

In accordance with the configuration described above, when the power failure is recovered, the power feeding states of the load circuits immediately before the power failure can be recreated.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
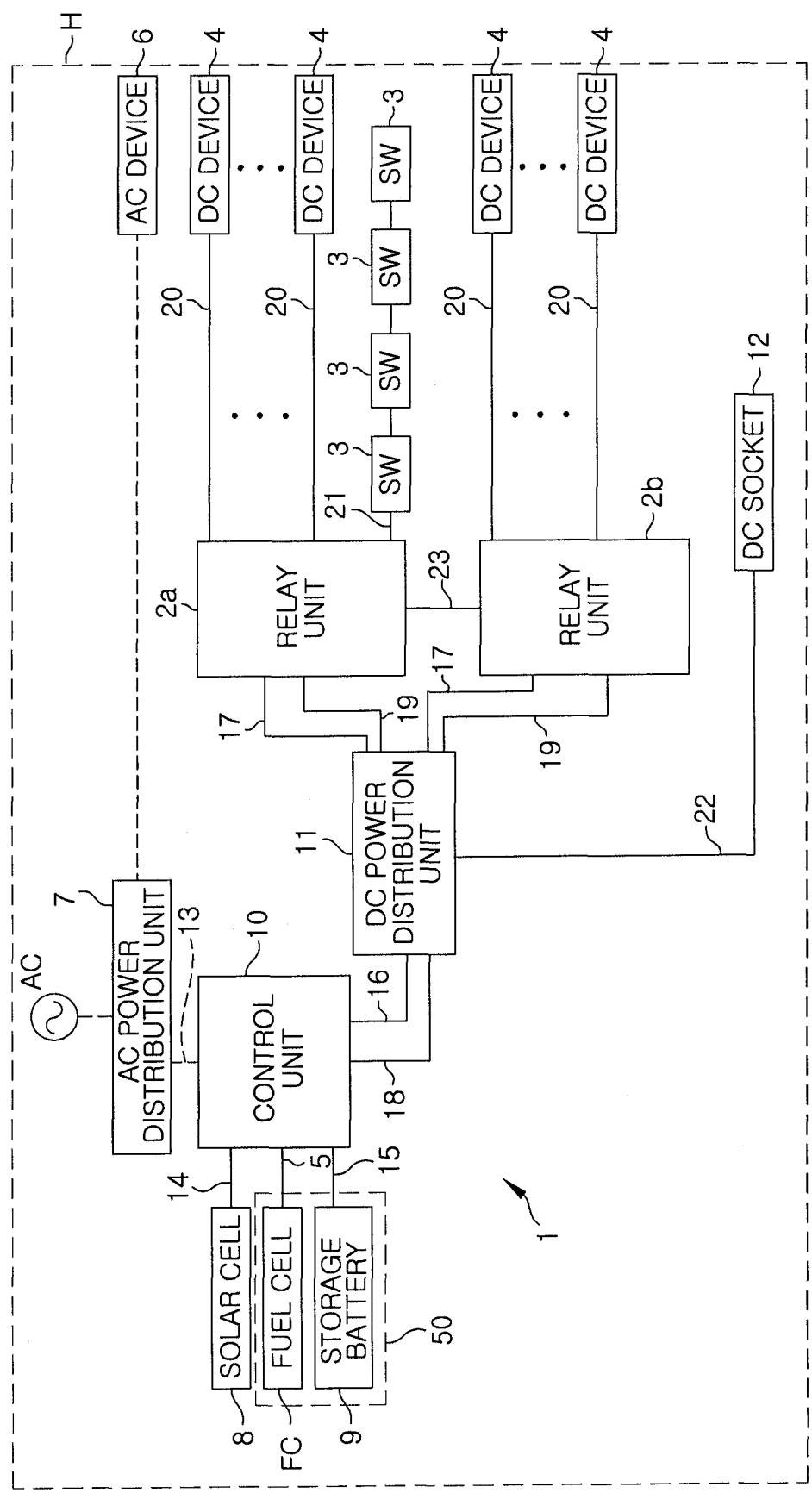
FIG. 1 shows a schematic system configuration of a load control system in accordance with an embodiment of the present invention.

The embodiments of the present invention will be described with reference to the accompanying drawings which form a part hereof. Throughout this specification and the drawings, like reference numerals designate like parts having substantially identical functions, and redundant description thereof will be omitted.

Hereinafter, the embodiments of the present invention will be described with reference to the drawings which form a part hereof. Although an example in which a load control system of the present invention is applied to a detached house will be described in the following embodiments, the load control system can be applied to an apartment, a business building or the like.

As shown in FIG. 1, a house H has therein DC devices 4 (e.g., an LED lighting device, a ventilation fan, an air conditioner, audio/video equipments and the like) as load devices which are operated by a DC power supplied thereto, and a load control system 1 for turning on/off the DC power feeding to the DC devices 4 connected to a plurality of load circuits.

In the load control system 1, a DC power supply unit for supplying a DC power for operating the entire system includes an AC-DC converter (not shown) for converting an AC power supplied from a commercial AC power supply AC for domestic use to a DC power, a fuel cell FC for generating a power by chemical reaction of materials, a solar cell 8 for generating a power from sunlight, and a storage battery 9 which is charged during a normal state other than power failure and discharges during the power failure. The DC power is supplied from the DC power supply unit to the load circuits.

The storage battery 9 includes a secondary battery such as a lithium battery or the like, and is charged during the power feeding period and discharges during the power failure. The fuel cell FC generates a power by electrochemical reaction between hydrogen and oxygen as source materials. The storage battery 9 and the fuel cell FC can supply the DC power during the power failure in the commercial AC power supply AC and thus form a backup power supply unit 50 for supplying a backup power during the power failure in the commercial AC power supply AC.

In addition, an AC power distribution unit 7 for distributing the AC power supplied from the commercial AC power supply AC to branch circuits is installed in the house H, so that the AC power is supplied from the AC power distribution unit 7 to an AC device 6 driven by the AC power.

In this system, a control unit 10 and a DC power distribution unit 11 having therein a DC breaker (not shown) serve as a power distribution unit for distributing the DC power supplied from the DC power supply unit to a plurality of load circuits. Further, one or more (e.g., two in this embodiment) relay units 2 (2a and 2b) serving as power supply control units are connected between the DC power distribution unit 11 and the load circuits. When the relay units are separately described, reference numerals 2a and 2b are used, whereas when common features of the relay units 2a and 2b are described, reference numeral 2 is used.

The DC power is supplied from the DC power distribution unit 11 to the relay units 2 via DC power lines 17. Moreover, a plurality of DC power lines 20 are connected to the relay units 2. Accordingly, the DC devices of the respective circuits can be operated or stop operation by independently turning on/off the power feeding to the DC power lines 20 of the respective circuits, as will be described later.

The AC power is supplied from the AC power distribution unit 7 to the control unit 10 via an AC power line 13, wherein the control unit 10 has therein an AC-DC converter (not shown) for converting the AC power to a DC power of a predetermined voltage. Further, the DC powers are supplied from the fuel cell FC and the solar cell 8 to the control unit 10 via DC power lines 5 and 14 to be converted into a DC power having a predetermined voltage by a DC-DC converter (not shown) installed in the control unit 10. The converted DC power is outputted to the DC power distribution unit 11 via a DC power line 16. The control unit 10 charges the storage battery 9 via a DC power line 15 with the power generated from the solar cell 8.

Further, the control unit 10, for example, when the power feeding from the commercial AC power supply AC is stopped due to a power failure or the like and the power generated by the solar cell 8 is smaller than the consumption power of the DC devices 4, discharges the storage battery 9. Also in this case, the DC powers supplied to the control unit 10 from the solar cell 8 and the fuel cell FC as well as from the storage battery 9 are supplied to the DC power distribution unit 11.

Furthermore, the control unit 10 has a function of delivering data with respect to the DC power distribution unit 11 via a signal line 18. Thus, the control unit 10 outputs, when detecting an abnormal state such as a power failure in the commercial AC power supply AC, an abnormal notification signal indicating the occurrence of the abnormal state to the DC distribution unit 11.

The DC power distribution unit 11 serves as a DC breaker for blocking a DC power, and distributes the DC power supplied from the control unit 10 to the relay units 2 via the power lines 17. In addition, the DC power distribution unit 11 is connected to the control unit 10 via the signal line 18 and also connected to the relay units 2 via signal lines 19, so that the data can be transmitted between the control unit 10 and the relay units 2.

For example, when the control unit 10 detects a power failure in the commercial AC power supply AC, a power failure notification signal is transmitted to the DC power distribution unit 11 and then to the relay units 2a and 2b. Further, the DC power distribution unit 11 supplies the DC power via DC power line 22 to a DC socket 12 installed in the house H in the form of, e.g., a wall socket or a bottom socket. When a plug of a DC device (not shown) is inserted into the DC socket 12, the DC power is directly supplied to the DC device.

The relay units 2 are connected to the DC power lines 20, and the respective DC power lines 20 are connected to one or more DC devices 4, forming a plurality of, e.g., four, load circuits. The relay units 2 can independently turn on/off the supply of the DC power to the respective load circuits. Further, only one of the relay units 2a and 2b, i.e., the relay unit 2a (main body), is connected to load operation terminals 3 for operating turn-on/off of the power feeding to their corresponding load circuits via the power line 21 (communications line). The relay unit 2a is connected to the other relay unit 2b via a communications line 23, and the communications line 23 and the power line 21 are electrically connected to each other inside the relay unit 2a. Accordingly, signals can be transmitted between the relay units 2 and the load operation terminals 3 via the communications line 23 and the power line 21.

The load operation terminals 3 are operated by the DC power supplied from the relay unit 2a and receive/transmit data from/to the relay units 2a through power line carrier communications using DBPSK (Differential Binary Phase Shift Keying) in which a communications signal for transmitting data by using a carrier wave of a high frequency is superposed on a DC voltage (e.g., DC 24V) supplied from the relay unit 2a to the power line 21. The relay units 2a and 2b supply the DC power (e.g., DC 48V) from the DC power distribution unit 11 to the power lines 20 and convert the operation states of the DC devices connected to load circuits as control targets by turning on/off the power feeding to the load circuits based on load control signals inputted from the load operation terminals 3.

Hereinafter, configurations of the relay units 2 and the load operation terminals 3 will be described in detail with reference to FIGS. 2A and 3.

Figure 2A:
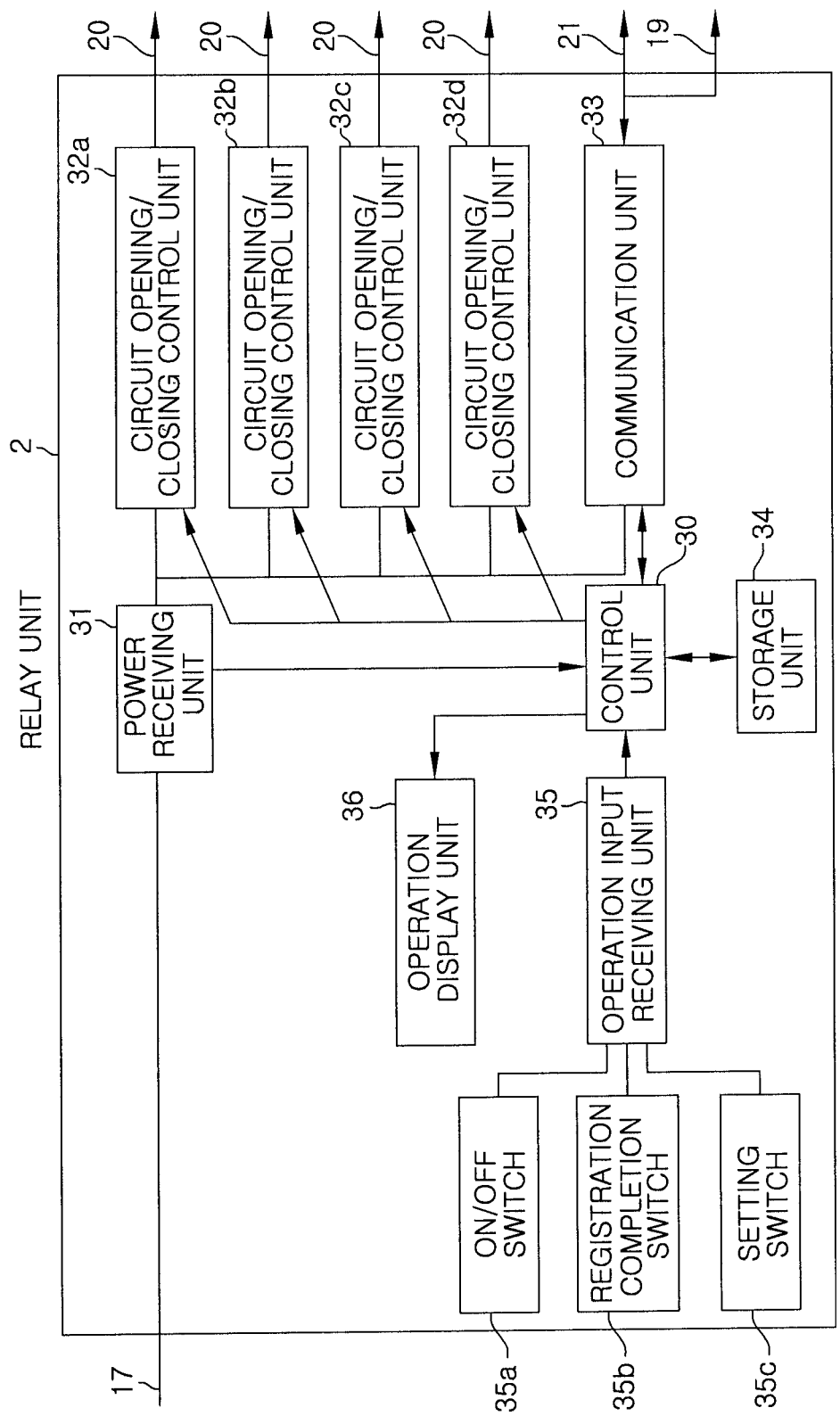
FIG. 2A describes a block diagram of a power supply control unit used in the load control system.

As depicted in FIG. 2A, each relay unit 2 includes: a control unit 30 including, e.g., a microcomputer, for performing overall control of the relay unit 2; a power receiving unit 31 for receiving the DC power from the DC power distribution unit 11 via the DC power line 17 and supplying an operation power to the control unit 30 and the like; circuit opening/closing control units 32a to 32d (power feeding on/off units), provided between the power receiving unit 31 and the DC power lines 20, for turning on/off the power feeding to the DC power lines 20 by turning on/off relays installed therein (not shown) based on opening/closing control signals inputted from the control unit 30; a communications unit 33 (first communications unit) for supplying a DC voltage (DC 24V) obtained by decreasing the DC voltage supplied from the power receiving unit 31 to the power line 21 and delivering a communications signal between the load operation terminals 3 and the DC power distribution unit 11 by superposing the communications signal on the DC voltage by using DBPSK; a storage unit 34 including an electrically rewritable nonvolatile memory (e.g., EEPROM (Electrically Erasable Programmable Read-Only Memory), flash memory or the like), for storing the power feeding states of the load circuits, identification information of the relay unit 2, a multicast address to be described later and the like; multiple on/off switches 35a (though FIG. 2A depicts just one on/off switch) provided for respective load circuits, each for setting whether to adopt a corresponding load circuit as a control target; a registration completion switch 35b for completing a registration mode to be described later; setting switches 35c for setting whether or not to supply the power on a load circuit basis during a power failure; an operation input receiving unit 35 for receiving operation inputs from the on/off switches 35a, the registration completion switch 35b, and the setting switches 35c; and an operation display unit 36 including, e.g., a display lamp such as a light emitting diode or the like, for displaying the power feeding states of the load circuits or the operation state of the relay unit 2 by changes in the light output state (light on, light off and light blink).

Figure 3:
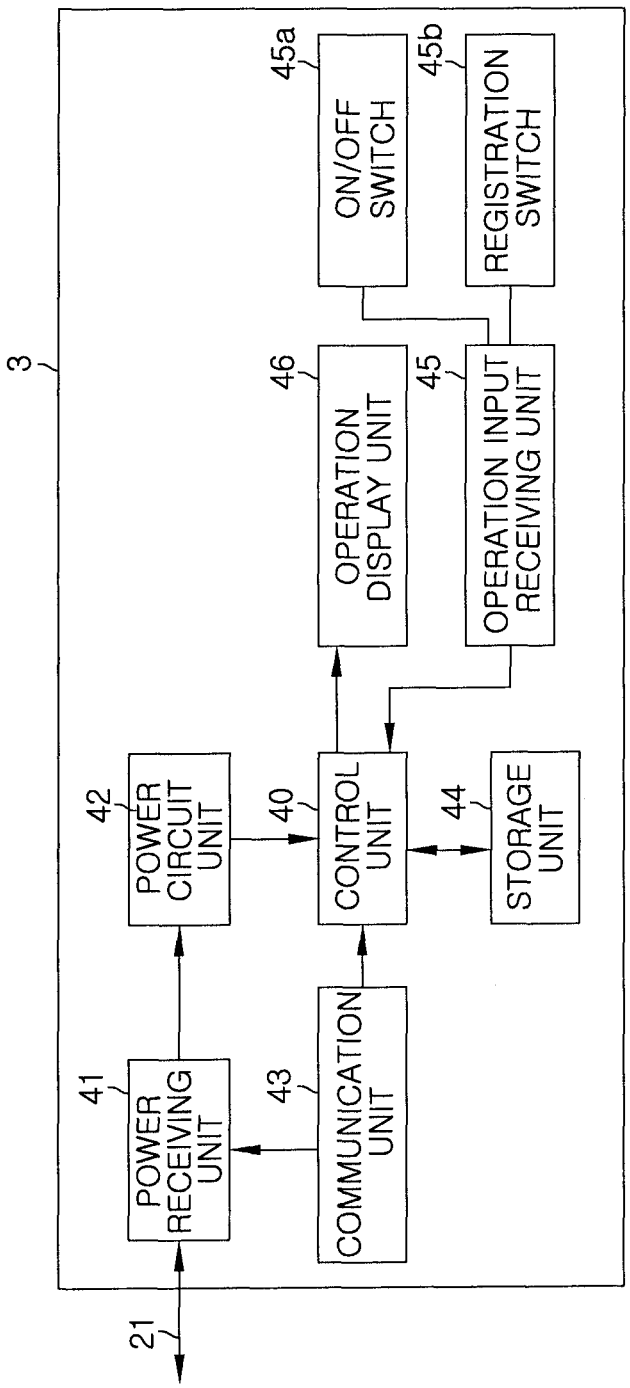
FIG. 3 provides a block diagram of a load operation terminal used in the load control system.

Meanwhile, as shown in FIG. 3, each load operation terminal 3 includes: a control unit 40 including, e.g., a microcomputer, for performing overall control of the load operation terminal 3; a power receiving unit 41 for receiving the DC power from the relay unit 2 via the power line 21; a power circuit unit 42 for generating an operation voltage of the control unit 40 or the like from the DC power received by the power receiving unit 41; a communications unit 43 (second communications unit) for receiving and transmitting a communications signal from and to the relay unit 2 by superposing the communications signal on the DC voltage (DC 24V) supplied from the relay unit 2 by using DBPSK; a storage unit 44 including an electrically rewritable nonvolatile memory (e.g., EEPROM, flash memory or the like), for storing information indicating correspondence between the on/off switches and the load circuits as control targets, identification information of the load operation terminal 3, a multicast address and the like; an on/off switch 45a serving as an operation device, for performing operation for turning on/off the power feeding to the load circuits as control targets independently; a registration switch 45b for starting the registration mode to be described later; an operation input receiving unit 45 for receiving an operation input from the on/off switch 45a and the registration switch 45b; and an operation display unit 46 including, e.g., a display lamp such as a light emitting diode or the like, for displaying the power feeding states of the load circuits as control targets or the operation mode of the load operation terminal 3 by changes in the light output state (light on, light off and light blink).

Here, the identification information assigned to the relay units 2 and the load operation terminals 3 may be unique physical addresses such as MAC (Media Access Control) addresses assigned by a hardware manufacturer, or addresses randomly assigned by a user. Preferably, the same identification information (address) is not assigned to the relay units 2 and the load operation terminals 3 of the same system.

The following is description of the operation of the system.

First, an operation for matching the load circuits as control targets with one or more on/off switches 45*a* of the load operation terminals 3 will be described.

When a user operates the registration switch 45*b* on one of the load operation terminals 3, the operation input of the registration switch 45*b* is inputted to the control unit 40 via the operation input receiving unit 45. The control unit 40 that has received the operation input of the registration switch 45*b* converts the operation mode from a normal mode, for performing on/off operation with regard to the power feeding to the load circuits, to a registration mode.

When the on/off switch 45*a* as a setting target operates in the registration mode, the operation input of the on/off switch 45*a* is inputted to the control unit 40 via the operation input receiving unit 45. The control unit 40 makes a display lamp corresponding to the operated on/off switch 45*a*, e.g., flicker to thereby indicate that a load circuit as a control target of the on/off switch 45*a* is being set. Further, the control unit 40 generates a communications signal including a control command for converting the operation mode of the relay unit 2 to the registration mode and multicast-transmits the communications signal from the communications unit 43. At this time, a multicast address is used as a destination address, and identification information of the load operation terminal 3 is used as a source address.

Since all of the relay units 2 and the load operation terminals 3 are assigned with multicast addresses and the signal is multicast-transmitted between the relay units 2 and the load operation terminals 3, it is possible to avoid a mistaken operation that may occur when the relay unit 2 or the load operation terminal 3 which is not assigned with multicast addresses is additionally connected. If such problems are negligible, the signal can be broadcast-transmitted between the relay units 2 and the load operation terminals 3.

When the communications signal transmitted from the load operation terminals 3 is received by the communications unit 33 of the relay unit 2, the control unit 30 of the relay unit 2 converts the operation mode from the normal mode to the registration mode based on the communications signal received by the communications unit 33 and then displays on the operation display unit 36 that the operation mode has been changed to the registration mode. Further, when a user operates an on/off switch 35*a* corresponding to a desired load circuit in the registration mode, the operation input of the on/off switch 35*a* is inputted to the control unit 30 via the operation input receiving unit 35.

The control unit 30 that has received the operation input of the on/off switch 35*a* makes a display lamp corresponding to the operated on/off switch 35*a*, e.g., flicker to thereby indicate that the load circuit corresponding to the on/off switch 35*a* has been set as a control target. Moreover, the control unit 30 generates a communications signal including the load number of the selected load circuit and unicast-transmits the communications signal from the communications unit 33 to the load operation terminal 3 that has requested the registration. At this time, identification information of the relay unit 2 is used as a destination address, and identification information of the load operation terminal 3 that has requested the registration is used as a source address.

In the load operation terminal 3 that has requested the registration, the communications unit 43 receives the communications signal transmitted from the relay unit 2, and the control unit 40 creates a data table which matches the on/off switch 45*a* as the setting target to the load circuit as the control target based on the load number and the identification information of the relay unit 2 which are included in the communications signal. The created data table is temporarily stored.

If multiple load circuits need to be set as the control target of the on/off switch 45*a*, the user continuously operates other on/off switches 35*a* of the relay units 2*a* and 2*b*. Then, the load circuits corresponding to the operated on/off switches 35*a* are set as the control target, and communications signals for registering these load circuits are transmitted to the load operation terminal 3. In the load operation terminal 3, the data table is updated to match the on/off switch 45*a* as the setting target to the multiple load circuits as the control target, and the renewed data table is temporarily stored.

After one or more load circuits are selected as the control target of the on/off switch 45*a* by the above-described operation, a user operates the registration completion switch 35*b* of one of the relay units 2*a* and 2*b* to thereby input the operation input of the registration completion switch 35*b* to the control unit 30 via the operation input receiving unit 35.

The control unit 30 that has received the operation input of the registration completion switch 35*b* generates a communications signal including a control command for converting the operation mode from the registration mode to the normal mode and multicast-transmits the communications signal from the communications unit 33. At this time, a multicast address is used as a destination address. Further, the control unit 30 converts the operation mode from the registration mode to the normal mode and displays on the operation display unit 36 that the operation mode has been changed to the normal mode.

Meanwhile, in the load operation terminal 3 that has requested the registration, when the communications unit 43 receives the communications signal transmitted from the relay unit 2, the control unit 40 stores in the storage unit 44 the data table created by the aforementioned process, in which the on/off switch 45*a* as the setting target corresponds to one or more load circuits as the control target.

Moreover, the control unit 40 of the load operation terminal 3 converts the operation mode from the registration mode to the normal mode and displays on the operation display unit 46 that the operation mode has been changed to the normal mode, thereby completing the registration mode.

In the above description, whenever the load circuits corresponding to the on/off switch 45*a* of the load operation terminal 3 are selected by the relay units 2*a* and 2*b* in the registration mode, the load numbers of the selected load circuits are notified to the load operation terminal 3. However, it is also possible to temporarily store the load numbers of the load circuits selected by the relay units 2*a* and 2*b* and notify the load numbers of the selected load circuits when the registration completion switch 35*b* in the relay unit 2 is operated.

In the above-described manner, the operation of matching the load circuits to the on/off switch 45*a* of the load operation terminal 3 is carried out, and a user performs the setting operation for all the load operation terminals 3. Depending on the setting operation, one or more load circuits as the control target can correspond to the on/off switch 45*a* of one of the load operation terminals 3.

In this system, the operation of matching the on/off switches 45*a* of the load operation terminals 3 to the load circuits (circuit opening/closing control units 32*a* to 32*d*) as control targets is performed by using various switches provided at the load operation terminals 3 and the relay units 2. Therefore, an additional setting device for matching is not required. However, an additional setting device (not shown) for matching may be provided to perform the matching of the on/off switches 45a of the load operation terminals 3 to the load circuits as control targets.

Hereinafter, an operation for turning on/off the power feeding to a desired load circuit by using the load operation terminal 3 will be described.

If the user operates the on/off switch 45a of the load operation terminal 3 while the relay units 2 are being operated in a normal mode, the operation input of the on/off switch 45a is inputted to the control unit 40 via the operation input receiving unit 45. The control unit 40 reads a load number of a load circuit corresponding to the operated on/off switch 45a from the data table stored in the storage unit 44. Further, the control unit 40 generates a communications signal including the load number and a control command for turning on/off the power feeding to the load circuit and transmits this communications signal to the corresponding relay unit 2 via the communications unit 43.

In the relay unit 2 that has received the communications signal, the control unit 30 turns on/off the power feeding to the load circuit as a control target by turning on/off the corresponding circuit opening/closing control units 32a to 32d based on the control command and the load number included in the communications signal received by the communications unit 33. Subsequently, the control unit 30 multicast-transmits, from the communications unit 33 to all the load operation terminals 3, a state notification signal (including the load number of the control target) for notifying the on/off state of the power feeding to the load circuit as the control target.

Then, in each of the load operation terminals 3, the communications unit 43 receives the state notification signal transmitted from the relay unit 2 and displays the operation state of the DC device 4 by turning on/off a display lamp corresponding to the on/off switch 45a in accordance with the operation state of the DC device 4 corresponding to the on/off switch 45a. Thus, in the load operation terminal 3, the on/off state of the load circuit corresponding to the on/off switch 45a can be checked by the light output state of the display lamp, which is preferable in switching an on/off state of the DC device 4 installed in a separate place.

Further, if one or more load circuits correspond to a single on/off switch 45a, the control unit 40 may turn on the display lamp corresponding to the on/off switch 45a when the power feeding to all the load circuits corresponding to the on/off switch 45a is stopped, and may turn off the display lamp when the power is supplied to at least one load circuit corresponding to the on/off switch 45a. Hence, the power feeding state of one or more load circuits as control targets can be checked by using the single display lamp. In addition, since the control unit 40 turns off the display lamp if the power is supplied to at least one load circuit, a user can stop the power feeding to all the load circuits by checking the display state of the display lamp.

The following is a description of an operation for backing up an operation power of the load device during a power failure. Each relay unit 2 has the setting switches 35c (e.g., slide switches) which are provided for each of the circuit opening/closing control units 32a to 32d so as to set whether or not to supply the power to the load circuits corresponding to the circuit opening/closing control units 32a to 32d during the power failure.

When the control unit 10 serving as a power failure notification unit detects a power failure in the commercial AC power supply AC, the control unit 10 makes the fuel cell FC start power generation and makes the storage battery 9 start discharging. Moreover, the control unit 10 supplies the power generated from the fuel cell FC, the power discharged from the storage battery 9 and the power generated from the solar cell 8 to the power distribution unit 11 and transmits a power failure notification signal indicating occurrence of the power failure to the relay units 2 via the DC power distribution unit 11.

When the communications unit 33 of the relay unit 2 receives the power failure notification signal, the control unit 30 of the relay unit 2 starts the control operation required during the power failure based on the power failure notification signal received by the communications unit 33. In detail, the control unit 30 stores in the storage unit 34 the power feeding states of the load circuits at that time (immediately before the occurrence of the power failure) and, then, turns on only the circuit opening/closing control units 32a to 32d set by the setting switches 35c and turns off the other circuit opening/closing control units 32a to 32d.

Hence, in the abnormal state such as the power failure or the like, the DC power can be supplied to only load circuits connected to desired DC devices 4 including, e.g., an LED lighting device, so as to operate only the desired DC devices 4.

After the power failure is recovered and a power failure recovery signal is transmitted from the control unit 10 to the relay units 2 via the DC power distribution unit (after the power failure notification signal is released), the control units 30 of the relay units 2 that have received the power failure recovery signal read the power feeding states immediately before the occurrence of the power failure from the storage unit 34 and turn on/off the circuit opening/closing control units 32a to 32d in accordance with the power feeding states immediately before the power failure.

Accordingly, the DC devices 4 of the load circuits can be operated or stop operation as in the state immediately before the power failure, and the power feeding states of the load circuits immediately before the power failure can be recreated.

Further, in a state where the relay units 2 that have received the power failure notification signal from the control unit 10 are supplying the power to the corresponding load circuits by turning on only the circuit opening/closing control units 32a to 32d set by the setting switches 35c, a user can operate the load operation terminal 3 to stop the operations of the DC devices 4 to which the power is being supplied.

In detail, when a user operates the on/off switch 45a of the load operation terminal 3 corresponding to the DC device 4 as a control target, the communications signal in accordance with the operation of the on/off switch 45a is transmitted from the load operation terminal 3 to the corresponding relay unit 2. The relay unit 2 turns off the corresponding circuit opening/closing control units 32a to 32d in accordance with the control instruction included in the communications signal, thereby stopping the power feeding to the DC devices 4 which are not required to be operated during the power failure. Hence, the consumption of the storage battery 9 for backup can be suppressed, and the power of the desired DC device 4 can be backed up for a longer period of time.

This embodiment describes the power feeding to a desired load circuit in regard to the occurrence of the power failure. However, the relay units 2 may be connected to an earthquake news receiving unit, a fire detector or a sensor for sensing a trespasser into a house. When detecting earthquake, fire, or entry of a trespasser into a house, the DC power can be supplied to preset load circuits to operate DC devices 4 corresponding to the preset load circuits.

As described above, in this system, the backup power is supplied from the backup power supply unit 50 to only a preset load circuit during the power failure without being supplied to other load circuits. Therefore, the power can be backed up to a desired DC device 4 for a longer period of time. Further, the DC devices 4 do not have to have communications function, so that low-cost general devices having no communications function can be used as the DC devices 4. Accordingly, a low-cost load control system can be achieved.

Moreover, whether or not to back up the power during the power failure can be easily set on a load circuit basis by using the setting switches 35*c*. Thus, the setting time can be reduced compared to the case of setting whether or not to back up the power during the power failure on a load device basis.

Further, in this system, the power supply unit supplies the DC power as the operation power; the backup power supply unit 50 includes a storage battery (secondary battery) 9; and the communications units 33 and 43 (first and second communications unit) of the relay units 2 and the load operation terminals 3 deliver the load control signals by superposing the signals on the DC voltage. Since the DC power is supplied to the DC devices 4 as load devices, the load devices do not require AC-DC converters for converting an AC power to a DC power. Therefore, conversion loss caused by the AC-DC conversion does not occur, and the power can be saved.

Further, when the load device is driven by the AC power, the output of the storage battery 9 forming the backup power supply unit 50 needs to be converted to the AC power and then supplied to the load device during the power failure. Hence, the conversion loss is caused by the AC-DC conversion and the power backup time of the storage battery 9 is reduced. However, in this system, the load devices are driven by the DC power, so that the conversion loss caused by converting the output of the storage battery 9 to AC power does not occur, and the power backup time of the storage battery 9 can be extended.

Figure 2B:
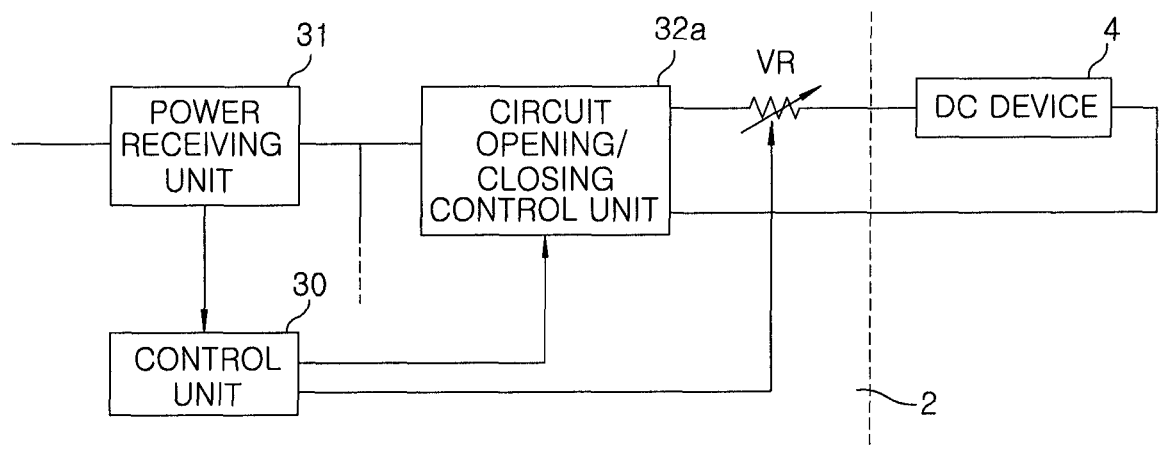
FIG. 2B depicts a block diagram of principal parts of a modification of the power supply control unit.

In addition, as shown in FIG. 2B, a variable resistor VR may be connected to an output of each of the circuit opening/closing control units 32*a* to 32*d*, and the control unit 30 may change a resistance of the variable resistor VR between when the power failure occurs and when the power is normally supplied (the circuit opening/closing control unit 32*a* being representatively shown in FIG. 2B).

Specifically, when the power failure detection signal is inputted, the control unit 30 changes the power supplied to the load circuit during the power failure to a relatively lower power by changing a resistance of the variable resistor VR to a relatively higher resistance. Therefore, the consumption of the backup power supply unit 50 can be reduced compared to when the power supplied in a normal state is supplied during the power failure and, also, the DC devices 4 can operate for a longer period of time.

When an LED lighting device is used as the DC device 4, the control unit 30 reduces the light output of the lighting device during the power failure compared to the light output obtained in the normal state, in consideration of the current supplied from the backup power supply unit 50 being limited during the power failure, to thereby turn on the lighting device for a longer period of time.

In the circuit shown in FIG. 2B, the power supplied to the load circuit during the power failure is reduced by changing the resistance of the variable resistor VR connected to the output of each of the circuit opening/closing control units 32*a* to 32*d*. However, when DC-DC converters are embedded in each of the circuit opening/closing control units 32*a* to 32*d* to make a voltage, supplied from the circuit opening/closing control units 32*a* to 32*d* to the load circuit, variable, the control unit 30 can also reduce the power supplied from the backup power supply unit 50 to the load circuit during the power failure by decreasing the voltage supplied to the load circuit.

While the invention has been shown and described with respect to the embodiments, it will be understood by those skilled in the art that various changes and modification may be made without departing from the scope of the invention as defined in the following claims.

What is claimed is:

1. A load control system, further comprising:
    a power supply control unit for controlling a power feeding to multiple load devices; and
    a backup power supply unit for supplying backup power during a power failure,
    wherein, during a power failure, the power supply control unit supplies the power from the backup power supply unit only to a part of load devices selected among the load devices, and the load devices are devoid of communications function for communicating with the power supply control unit,
    wherein the load control system further comprises:
    a power supply unit for supplying an operation power of the whole system;
    a load operation terminal connected to the power supply control unit via a communications line;
    a power failure notification unit for outputting, when a the power failure is detected, a power failure notification signal to the power supply control unit; and
    a number of load circuits, each of which having one or more of the load devices connected to the power supply control unit via power lines,
    wherein the power supply control unit includes power feeding on/off units, each of which being connected to one of the load circuits, to independently turn on or off the power feeding to corresponding load circuits, thereby operating or stopping the load devices of the load circuits; a first communications unit for receiving a load control signal inputted via the communications line; and a control circuit for switching on or off one or more power feeding on/off units corresponding to the load control signal received by the first communications unit,
    wherein the load operation terminal includes an operation unit for performing on/off operation of one or more target load circuits; and a second communications unit for receiving an operation input from the operation unit and outputting to the communications line the load control signal for controlling said one or more the power feeding on/off units corresponding to the target load circuits,
    wherein the control circuit of the power supply control unit controls, when the power failure notification signal is received from the power failure notification unit, the power feeding on/off units to supply the backup power from the backup power supply unit only to a part of the load circuits, and
    wherein the power supply control unit further includes a storage unit for storing a power feeding state of the respective load circuits immediately before the power failure occurs; and when the power failure is recovered, the control circuit controls the power feeding on/off units to return to the power feeding state immediately before the power failure occurs based on the power feeding state stored in the storage unit.

2. The load control system of claim 1, wherein the power supply control unit further includes a setting unit for setting one or more load circuits to which the backup power is supplied during the power failure; and when the power failure notification signal is received, the control circuit controls the power feeding on/off units to supply the backup power from the backup power supply unit only to the load circuits set by the setting unit.

3. The load control system of claim 2, wherein the backup power supply unit includes a secondary battery, the power supply unit supplies a DC power as the operation power, and the first and the second communications unit receive and transmit the load control signal by superposing signals on DC voltage.

4. The load control system of claim 3, wherein a power level of the backup power supplied by the backup power supply unit during the power failure is less than that of the operation power supplied by the power supply unit in a normal state other than the power failure.

5. The load control system of claim 2, wherein a power level of the backup power supplied by the backup power supply unit during the power failure is less than that of the operation power supplied by the power supply unit in a normal state other than the power failure.

6. The load control system of claim 1, wherein the backup power supply unit includes a secondary battery, the power supply unit supplies a DC power as the operation power, and the first and the second communications unit receive and transmit the load control signal by superposing signals on DC voltage.

7. The load control system of claim 6, wherein a power level of the backup power supplied by the backup power supply unit during the power failure is less than that of the operation power supplied by the power supply unit in a normal state other than the power failure.

8. The load control system of claim 1, wherein a power level of the backup power supplied by the backup power supply unit during the power failure is less than that of the operation power supplied by the power supply unit in a normal state other than the power failure.

9. The load control system of claim 8, wherein the load devices are lighting devices.

\* \* \* \* \*